United States Patent [19]

Altermatt

[11] 4,160,689
[45] Jul. 10, 1979

[54] SHEET SEALING SHOE ASSEMBLY

[75] Inventor: Willy Altermatt, Neuhausen am Rheinfall, Switzerland

[73] Assignee: SIG Schweizerische Industrie-Gesellschaft, Rheinfall, Switzerland

[21] Appl. No.: 845,614

[22] Filed: Oct. 26, 1977

[30] Foreign Application Priority Data

Nov. 23, 1976 [CH] Switzerland ............... 14727/76

[51] Int. Cl.² ............................................. B30B 15/34
[52] U.S. Cl. ........................ 156/583.1; 93/DIG. 1; 100/93 P; 100/237; 156/583.4
[58] Field of Search .............. 156/583, 251, 290, 515, 156/553, 580, 587; 100/93 P, 237, 276; 93/DIG. 1, 33 H

[56] References Cited

U.S. PATENT DOCUMENTS

| 3,338,767 | 8/1967  | Fuller     | 156/581   |
| 3,506,510 | 4/1970  | Berleyoung | 156/580   |
| 3,624,836 | 11/1971 | Rohdin     | 156/583 X |
| 3,721,602 | 3/1973  | Bosse      | 156/583   |
| 3,779,838 | 12/1973 | Wech       | 156/583   |
| 4,012,274 | 3/1977  | Lang-Ree   | 156/502   |
| 4,016,026 | 4/1977  | Grevich    | 156/583   |

Primary Examiner—Michael G. Wityshyn
Attorney, Agent, or Firm—Spencer & Kaye

[57] ABSTRACT

A sealing shoe assembly for forming a seam, by application of heat and pressure, on face-to-face arranged sheets disposed between a backup support and the sealing shoe assembly cooperating with the backup support has an elongated carrier and a sealing shoe supported on the carrier. The sealing shoe is formed of at least two sealing shoe parts which are arranged on the carrier in longitudinal alignment with respect to one another and which are individually and resiliently secured to the carrier.

12 Claims, 6 Drawing Figures 4,160,689

SHEET SEALING SHOE ASSEMBLY

BACKGROUND OF THE INVENTION

This invention relates to an assembly for heating and applying (pressing) a sheet sealing shoe against a backup support for the purpose of forming a seam between two or more face-to-face arranged thin sheets positioned between the shoe and the backup support. The assembly includes a carrier on which the shoe is resiliently supported.

Assemblies of the above-outlined type operate satisfactorily provided that the sealing shoe is relatively short. The longer the sealing shoe, the more difficult it is to achieve a uniform pressure and temperature distribution along its entire length. As a result, the seams may not be of sufficient overall strength and tightness.

SUMMARY OF THE INVENTION

It is an object of the invention to provide an improved sheet sealing shoe assembly of the above-outlined type from which the discussed disadvantages are eliminated.

This object and others to become apparent as the specification progresses, are accomplished by the invention, according to which, briefly stated, the sealing shoe is formed of at least two shoe parts which are in longitudinal alignment with one another and which are individually resiliently supported on a carrier.

DESCRIPTION OF THE PREFERRED EMBODIMENT

Figure 3:
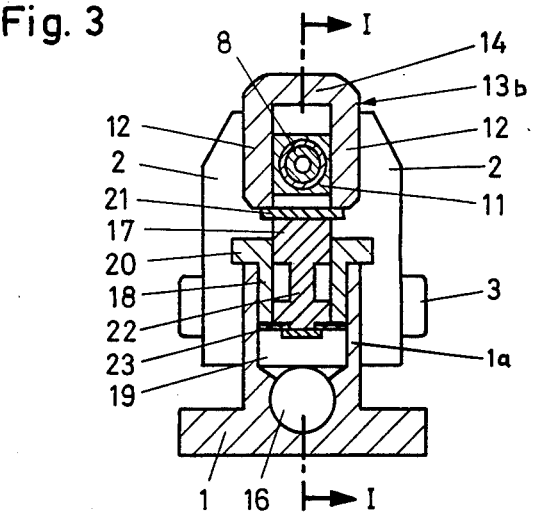
FIG. 3 is a sectional view taken along line III—III of FIG. 1.
Figure 4:
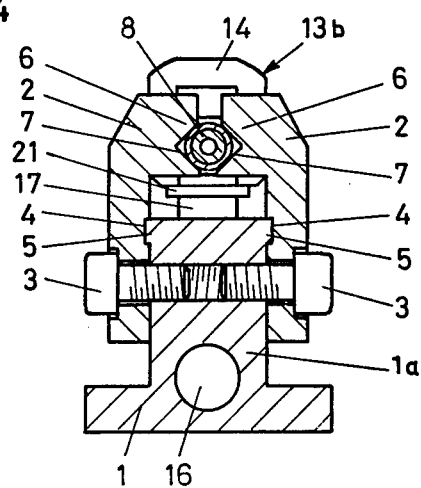
FIG. 4 is a sectional view taken along line IV—IV of FIG. 1.
Figure 5:
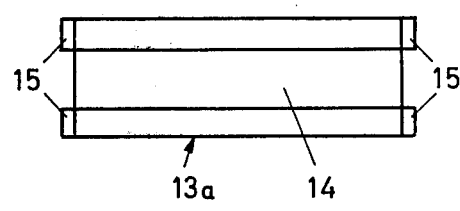
FIG. 5 is a top plan view of a detail of the preferred embodiment.

Turning now to FIGS. 1 through 4, the sealing shoe assembly illustrated therein comprises an elongated carrier 1, to which there are secured, by means of screws 3, three longitudinally spaced pairs of oppositely arranged holders 2 which, as well seen in FIG. 4, have a U-shaped cross section and into which extends a rail portion 1a of the carrier 1. On both sides, the rail portion 1a has an integral longitudinal edge strip 5 accommodated in grooves 4 provided within the holder 2. Each holder 2 has at its upper end a projection 6 oriented inwardly (that is, towards the other holder of the same pair) and is provided with a recess 7. The two recesses 7 of each holder pair cooperate to firmly hold an electric heater bar 8 arranged centrally and in the length dimension of the carrier 1. Thus, the three holder pairs firmly support the heater bar 8 on the carrier 1. The heater bar 8 which conventionally comprises a resistance wire, an insulator and a metal sleeve, is provided at its longitudinal ends with terminal posts 9 for electric conductors 10. On the heater bar 8 there are displaceably supported two hollow metallic heat transmitting members 11 which have a circular inner outline and a quadratic external outline. By virtue of this configuration, the heat transmitting members 11 fit with a small clearance on the heater bar 8 and between the legs 12 of two sealing shoe parts 13a and 13b, each having a U-shaped cross section. The web of each "U", the outer face of which constitutes the work face of the respective shoe part, is designated at 14. This overall arrangement is best seen in FIG. 3. The sealing shoe as a whole is formed of the two separate shoe parts 13a, 13b. It is feasible, however, to provide a greater number of serially arranged shoe parts to form one shoe. The sealing shoe serves, in a conventional manner, to provide a bonding seam between two or more face-to-face arranged, sealable thin sheets which are pressed by the heated shoe against a backup support (not shown in FIG. 1-4) to thus form, by application of heat and pressure, a sealing seam. Each sealing shoe part 13a, 13b has at the end of its legs, two pairs of longitudinal projections 15 (FIG. 5) which limit an upward movement of the respective sealing shoe part by means of the abutting cooperation with the projections 6 of the holders 2.

Figure 1:
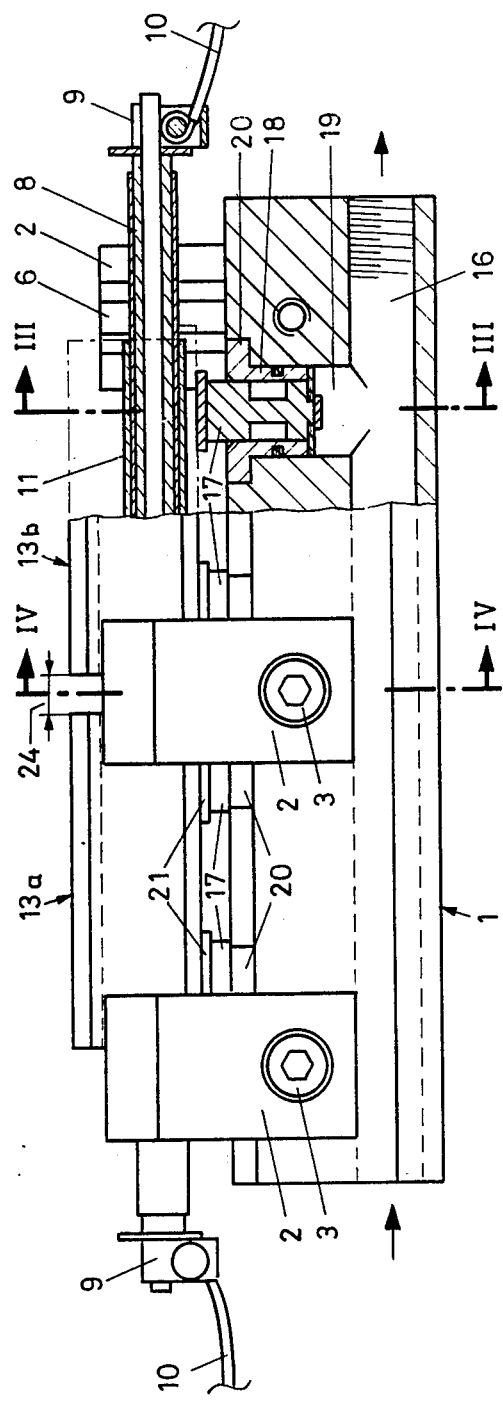
FIG. 1 is a side elevational view (partially in section along lines I—I of FIG. 3) of a preferred embodiment of the invention.
Figure 2:
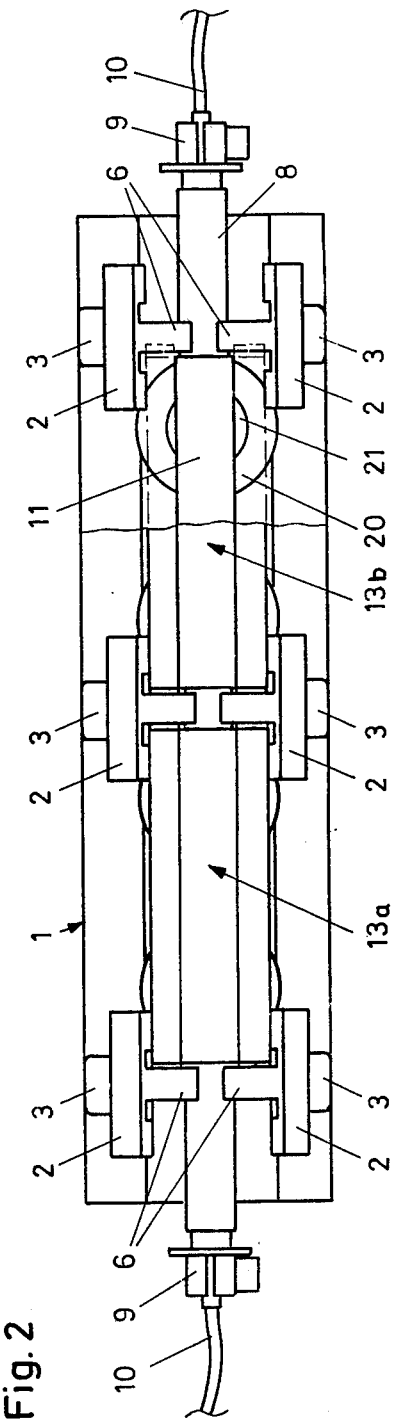
FIG. 2 is a top plan view of the structure shown in FIG. 1.

In order to displace the sealing shoe 13a, 13b upwardly, that is, in the direction of the cooperating backup support, pressurized air is introduced into a passage 16 extending longitudinally in the carrier 1. Underneath each sealing shoe part 13a and 13b, there are situated respective pistons 17, each displaceably arranged in a respective bushing sleeve 18 as seen in FIGS. 1 and 3. Each bushing sleeve 18 is accommodated in respective bores 19 which are provided in the carrier 1 and which extend perpendicularly to the longitudinal passage 16. Each bore 19 is sealed with respect to the passage 16. Each bushing sleeve 18 has a circumferential flange 20 which projects, along a peripheral part thereof, into the groove 4 of the adjoining holder 2. This arrangement ensures that the bushing sleeve 18 is fixedly supported on the carrier 1.

Each piston 17 is, on its upper (outer) portion, provided with a concentric disc 21 which supports the legs 12 of the respective sealing shoe part 13a or 13b and further has an axially relatively long and radially relatively deep groove 22 which serves as a heat insulation for preventing a cooling of the sealing shoe parts and a heating of a circular diaphragm 23 which traverses the bore 19 and which is affixed to that terminus of the piston 17 which is oriented towards the longitudinal passage 16.

The above-described arrangement provides that the two sealing shoe parts 13a and 13b are uniformly heated and are uniformly resiliently movable back and forth with respect to the backup support, so that the resulting seam is significantly improved as compared to a seam made with a conventional one-piece shoe having twice the length of the individual shoe part 13a or 13b.

The seam made with the particular sealing shoe structure described above has a discontinuity, because between the two sealing shoe parts 13a and 13b there is a spacing 24 corresponding to the thickness of the projections 6 of the holders 2. Such a discontinuity in the seam is desirable in case the seam is to be traversed by an additional seam which may be provided, for example, by the periphery of a heated disc.

Figure 6:
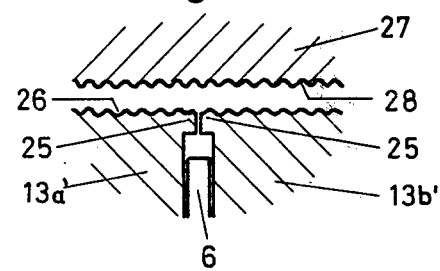
FIG. 6 is a longitudinal sectional view of a modified detail of the preferred embodiment.

In case the seam formed with the multi-part sealing shoe should be without discontinuity, the sealing shoe parts 13a and 13b may be so structured at their ends oriented to one another that they extend over the projections 6, as illustrated in FIG. 6. As seen, the work face formed on the back of the sealing shoe parts 13a' and 13b' is provided with grooves 26. Similarly, the backup support 27 is provided with grooves 28 which match with the grooves 26. The parting gap between the two sealing shoe parts 13a' and 13b' in a groove formed of longitudinal halves at the edge of the one and the other sealing shoe parts 13a' and 13b' and is aligned with a ridge on the backup support 27. Because of the displaceability and play of the sealing shoe parts, this arrangement results in a tensioning of the sheet situated between the sealing shoe and the backup support. The parting plane between the sealing shoe pats 13a' and 13b' need not be oriented perpendicularly to the longitudinal direction thereof; it may be arranged at an oblique angle thereto.

Further, means other than compressed air may conceivably be utilized for operating the sealing shoe. Thus, between the individual sealing shoe parts 13a and 13b and the carrier 1 compression springs may be arranged and the carrier 1 may be mechanically moved towards the backup support, whereby again, a resilient, very uniform engagement of the sealing shoe (as a whole) with the backup support is achieved. It is further feasible to construct the carrier 1 of two or more serially arranged, aligned parts.

It is to be understood that the term "sealing shoe" is to be interpreted broadly: it also encompasses shoes which are heated to such an extent that the weldable sheets are bonded to one another by means of a weld. The current for heating the bar 8 may be conventionally controlled in such a manner that seam forming temperatures are ensured dependent upon the sheet material used. It is of no consequence in relation to the device whether the seam formation is obtained by a melting and commingling of the material of the entire sheet (welding) or such melting occurs only in the coating of such sheet (thus obtaining a sealing effect in a narrower sense).

It will be understood that the above description of the present invention is susceptible to various modifications, changes and adaptations and the same are intended to be comprehended within the meaning and range of equivalents of the appended claims.

What is claimed is:

1. In a sealing shoe assembly for forming a seam, by application of heat and pressure, on face-to-face arranged sheets disposed between a backup support and the sealing shoe assembly cooperating with the backup support; the assembly including an elongated carrier and a sealing shoe supported on the carrier; the improvement wherein said sealing shoe is formed of at least two sealing shoe parts arranged on said carrier in longitudinal alignment with respect to one another; each said sealing shoe part having a U-shaped cross section formed of opposite legs and a web portion; each leg of each said sealing shoe part having a longitudinal first projection protruding in the length dimension of the respective sealing shoe part beyond the outline thereof; the improvement further comprising
   (a) piston means individually and resiliently movably securing each said sealing shoe part to said carrier; said piston means comprising pistons being in engagement with each said sealing shoe part and being axially slidably supported in said carrier;
   (b) means within said carrier for admitting a pressurized medium simultaneously to each said piston for urging each said sealing shoe part towards said backup support;
   (c) a plurality of holders attached in a spaced relationship to said carrier; said holders being arranged at the opposite ends of each said sealing shoe part; each holder having a second projection disposed in the path of travel of a respective first projection for limiting the motion of each said sealing part away from said carrier;
   (d) a longitudinal heater bar arranged on said carrier in the length dimension thereof and being held by said holders; and
   (e) an elongated heat transmitting member surrounding said heater bar and being slidable with respect thereto; each said sealing shoe part straddling said heat transmitting member with said legs.

2. A sealing shoe assembly as defined in claim 1, wherein each said sealing shoe part is in engagement with two of said pistons.

3. A sealing shoe assembly as defined in claim 1, wherein each sealing shoe part has a work face provided with a plurality of first grooves arranged in a series extending in the length dimension of said carrier; said backup support being provided with a plurality of second grooves matching with said first grooves.

4. In a sealing shoe assembly for forming a seam, by application of heat and pressure, on face-to-face arranged sheets disposed between a backup support and the sealing shoe assembly cooperating with the backup support; the assembly including an elongated carrier and a sealing shoe supported on the carrier; the improvement wherein said sealing shoe is formed of at least two sealing shoe parts arranged on said carrier in longitudinal alignment with respect to one another; each said sealing shoe part has a U-shaped cross section formed of opposite legs and a web portion; the improvement further comprising
   (a) piston means individually and resiliently movably securing each said sealing shoe part to said carrier; said piston means comprising pistons being in engagement with each said sealing shoe part and being axially slidably supported in said carrier; each piston having an axially relatively long and a radially relatively deep circumferential heat insulating groove;
   (b) means within said carrier for admitting a pressurized medium simultaneously to each said piston for urging each said sealing shoe part towards said backup support; the means for admitting a pressurized medium comprising bores accommodating said pistons;
   (c) a diaphragm carried by that end of each piston which is oriented away from said sealing shoe parts; the diaphragms extending in the respective bore transversely thereto;
   (d) a plurality of holders attached in a spaced relationship to said carrier;
   (e) a longitudinal heater bar arranged on said carrier in the length dimension thereof and being held by said holders; and
   (f) an elongated heat transmitting member surrounding said heater bar and being slidable with respect thereto; each said sealing shoe part straddling said heat transmitting member with said legs.

5. A sealing shoe assembly as defined in claim 4, wherein said means within said carrier for admitting a pressurized medium comprises a passage extending within said carrier in the length dimension thereof; said passage being in communication with said bores.

6. A sealing shoe assembly as defined in claim 4, further comprising a bushing sleeve arranged in each bore; each piston being slidably received in the respective bushing sleeve.

7. A sealing shoe assembly as defined in claim 6, wherein said bushing sleeves are clamped to said carrier by said holders.

8. A sealing shoe assembly as defined in claim 4, wherein each said sealing shoe part is in engagement with two of said pistons.

9. A sealing shoe assembly as defined in claim 4, wherein each sealing shoe part has a work face provided with a plurality of first grooves arranged in a series extending in the length dimension of said carrier; said backup support being provided with a plurality of second grooves matching with said first grooves.

10. In a sealing shoe assembly for forming a seam, by application of heat and pressure, on face-to-face arranged sheets disposed between a backup support and the sealing shoe assembly cooperating with the backup support; the assembly including an elongated carrier and a sealing shoe supported on the carrier; the improvement wherein said sealing shoe is formed of at least two sealing shoe parts arranged on said carrier in longitudinal alignment with respect to one another; the improvement further comprising means individually and resiliently movably securing each said sealing shoe part to said carrier; and a plurality of holders attached in a spaced relationship to said carrier; the holders having a projection extending transversely to the length dimension of said carrier between adjoining sealing shoe parts; each sealing shoe part having a work face extended in the length dimension of said carrier to assume an overlapping relationship with respect to the projections adjoining the respective sealing shoe part.

11. A sealing shoe assembly as defined in claim 10, wherein each sealing shoe part has a work face provided with a plurality of first grooves arranged in a series extending in the length dimension of said carrier; said backup support being provided with a plurality of second grooves matching with said first grooves; the work faces of two adjoining sealing shoe parts define a parting gap therebetween; said parting gap being situated in one of said first grooves; said one of said first grooves being formed of two longitudinal halves formed on the one and the other work face of adjoining sealing shoe parts.

12. A sealing shoe assembly as defined in claim 10, wherein each sealing shoe part has a work face provided with a plurality of first grooves arranged in a series extending in the length dimension of said carrier; said backup support being provided with a plurality of second grooves matching with said first grooves.

* * * * *